United States Patent
Sugimoto

(10) Patent No.: US 10,087,858 B2
(45) Date of Patent: Oct. 2, 2018

(54) VEHICLE AND CONTROL METHOD FOR VEHICLE

(71) Applicant: TOYOTA JIDOSHA KABUSHIKI KAISHA, Toyota-shi, Aichi-ken (JP)

(72) Inventor: Hitoki Sugimoto, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/126,408

(22) PCT Filed: Mar. 16, 2015

(86) PCT No.: PCT/IB2015/000335
§ 371 (c)(1),
(2) Date: Sep. 15, 2016

(87) PCT Pub. No.: WO2015/140619
PCT Pub. Date: Sep. 24, 2015

(65) Prior Publication Data
US 2017/0082039 A1    Mar. 23, 2017

(30) Foreign Application Priority Data
Mar. 18, 2014  (JP) .................. 2014-054863

(51) Int. Cl.
*F02D 41/00* (2006.01)
*B60L 1/00* (2006.01)
(Continued)

(52) U.S. Cl.
CPC .......... *F02D 41/005* (2013.01); *B60L 1/006* (2013.01); *F02B 63/04* (2013.01);
(Continued)

(58) Field of Classification Search
CPC .............. F02D 41/005; F02D 41/1454; F02D 2200/1012; F02D 41/1498; F02B 63/04;
(Continued)

(56) References Cited

U.S. PATENT DOCUMENTS

| 4,373,498 A * | 2/1983 | Ushimura | ........... F02D 41/0065 123/568.21 |
| 2002/0078682 A1* | 6/2002 | Igarashi | ................. B60K 6/485 60/280 |

(Continued)

FOREIGN PATENT DOCUMENTS

| CN | 102817730 A | 12/2012 |
| CN | 103208853 A | 7/2013 |

(Continued)

*Primary Examiner* — Joseph Dallo
(74) *Attorney, Agent, or Firm* — Finnegan, Henderson, Farabow, Garrett & Dunner, LLP

(57) ABSTRACT

A vehicle includes an engine and an electric power output device that is configured to output electric power generated by using the engine to the outside of the vehicle. The engine includes an EGR device for recirculating exhaust gas of the engine to an intake side. The vehicle further includes a controller for controlling a recirculation amount of the exhaust gas by the EGR device in accordance with a load of the engine. The controller restricts the recirculation amount of the exhaust gas under the same load in the case where the electric power output device outputs the electric power to the outside of the vehicle in comparison with a case where the electric power output device does not output the electric power to the outside of the vehicle.

11 Claims, 10 Drawing Sheets

(51) Int. Cl.
*F02M 26/53* (2016.01)
*F02B 63/04* (2006.01)
*H02K 7/18* (2006.01)
*B60W 10/00* (2006.01)
*F02D 41/14* (2006.01)
*B60K 6/22* (2007.10)

(52) U.S. Cl.
CPC ......... *F02D 41/1454* (2013.01); *F02M 26/53* (2016.02); *H02K 7/1815* (2013.01); *B60K 6/22* (2013.01); *B60W 10/00* (2013.01); *B60Y 2200/92* (2013.01); *B60Y 2400/442* (2013.01); *B60Y 2400/60* (2013.01); *F02D 41/1498* (2013.01); *F02D 2200/1012* (2013.01); *F02D 2200/1015* (2013.01); *Y02T 10/47* (2013.01); *Y10S 903/904* (2013.01)

(58) Field of Classification Search
CPC .. H02K 7/1815; F02M 26/53; B60Y 2200/92; B60Y 2400/60; B60Y 2400/442; B60K 6/22; Y10S 903/904; Y02T 10/47; B60L 1/006
See application file for complete search history.

(56) References Cited

U.S. PATENT DOCUMENTS

| | | | |
|---|---|---|---|
| 2002/0092293 A1 | 7/2002 | Yasui et al. | |
| 2006/0162333 A1* | 7/2006 | Isogai | F02B 37/005 60/601 |
| 2008/0256929 A1* | 10/2008 | Sugimoto | F02D 29/02 60/278 |
| 2009/0078898 A1* | 3/2009 | Sasaki | F02D 41/0077 251/129.11 |
| 2009/0299560 A1 | 12/2009 | Tomatsuri et al. | |
| 2010/0030455 A1* | 2/2010 | Akimoto | B60K 6/445 701/111 |
| 2010/0089370 A1* | 4/2010 | Furukawa | F02M 26/26 123/568.12 |
| 2011/0290218 A1 | 12/2011 | Yoshioka | |
| 2012/0309585 A1* | 12/2012 | Whitney | B60K 6/48 477/5 |
| 2012/0316760 A1 | 12/2012 | Grieser et al. | |
| 2013/0047941 A1* | 2/2013 | Niwa | F02D 9/1065 123/90.11 |
| 2013/0184968 A1* | 7/2013 | Kumano | B60L 11/1842 701/102 |
| 2013/0333648 A1* | 12/2013 | Sasaki | F02D 13/0242 123/90.15 |
| 2015/0210179 A1* | 7/2015 | Teraya | B60K 6/445 307/10.1 |
| 2017/0082039 A1 | 3/2017 | Sugimoto | |

FOREIGN PATENT DOCUMENTS

| | | |
|---|---|---|
| EP | 2 410 161 A1 | 1/2012 |
| EP | 2 614 981 A2 | 7/2013 |
| JP | 8-170540 | 7/1996 |
| JP | 2000-161119 | 6/2000 |
| JP | 2004-278310 | 10/2004 |
| JP | 2009299664 A * | 12/2009 |
| JP | 2010-222972 | 10/2010 |
| JP | 2011-195075 | 10/2011 |
| JP | 4964193 B2 * | 6/2012 |
| JP | 2013032751 A * | 2/2013 |
| JP | 2013-137036 | 7/2013 |
| JP | 2013-142380 | 7/2013 |
| JP | 2015-175357 A | 10/2015 |
| WO | WO 2008/050900 A1 | 5/2008 |
| WO | WO 2010/092698 A1 | 8/2010 |

* cited by examiner

VEHICLE AND CONTROL METHOD FOR VEHICLE

CROSS-REFERENCE TO RELATED APPLICATIONS

This application is a national phase application of International Application No. PCT/IB2015/000335, filed Mar. 16, 2015, and claims the priority of Japanese Application No. 2014-054863, filed Mar. 18, 2014, the content of both of which is incorporated herein by reference.

BACKGROUND OF THE INVENTION

1. Field of the Invention

The present invention relates to a vehicle and a control method therefor and in particular relates to a vehicle that can supply electric power generated by using an internal combustion engine to the outside of the vehicle and a control method therefor.

2. Description of Related Art

A vehicle that is configured to be able to supply electric power to the outside of the vehicle while it is parked (hereinafter, electric power feed to the outside of the vehicle is also referred to as "outside electric power feed") has been known. In a hybrid vehicle that is a representative example of such a vehicle, not only the electric power that is stored in an electric storage device installed in the vehicle is supplied, but also the electric power that is generated by using power of an internal combustion engine can be supplied.

For example, Japanese Patent Application Publication No. 2013-142380 (JP 2013-142380 A) discloses an electric power supply system that determines a control amount of the internal combustion engine on the basis of information from the outside of the vehicle (temporal transition of an electric power demand including future predictions or an amount of the electric power from another electric power supply that can be supplied including future predictions) when the electric power is fed to the outside.

Some of the internal combustion engines are provided with a recirculation device (hereinafter also referred to as an "exhaust gas recirculation (EGR) device) for recirculating some of exhaust gas of the internal combustion engine to an intake side. In JP 2013-142380 A, as the control amounts of the internal combustion engine, an electric power generation amount by the internal combustion engine and a recirculation amount of the exhaust gas by the EGR device (hereinafter also referred to as an "EGR amount") are determined. More specifically, in JP 2013-142380 A, if it is determined that there is no chance of an increase in the electric power demand in the future during the outside electric power feed, the EGR amount is set in accordance with a speed of the internal combustion engine and requested torque by using a similar method that is used during traveling of the vehicle. On the other hand, if it is determined that there is a chance of an increase in electric power usage from current time to time after a specified period, an EGR increased amount is added to a set value of the above EGR amount. Accordingly, in JP 2013-142380 A, when there is a chance of the increase in the electric power demand in the future, a catalyst temperature can be lowered, and the EGR amount is thereby increased. In this way, electric power generation efficiency of the internal combustion engine is improved while exhaust gas purifying performance of the catalyst is maintained.

SUMMARY OF THE INVENTION

In the above vehicle, when the electric power is fed to the outside, the internal combustion engine is normally operated for a long time period in a relatively lower load state than the load state during traveling of the vehicle.

Here, if the EGR device is actuated in the low load state of the internal combustion engine, unburned fuel (soot, hydrocarbon, and the like) contained in the exhaust gas that is recirculated to the intake side tends to be adhered to an injection hole of an injector or an ignition plug and gradually accumulated. If clogging of the injector or smoking of the ignition plug occurs due to this accumulation of deposits, normal fuel injection and ignition can no longer be carried out. As a result, a combustion state of the internal combustion engine is destabilized, which further may lead to a state of misfire. If the state of misfire continues, the unburned fuel reaches the catalyst. Then, a temperature of the catalyst is increased by a reaction of the unburned fuel with oxygen, and this may cause erosion of the catalyst.

Noted that, in a high load state of the internal combustion engine, a fuel injection amount that is injected from an injection hole of the injector is increased. Thus, the deposits near the injection hole can be blown off by fuel injection. In addition, a temperature of a combustion chamber is increased, and thus smoking of the ignition plug can be resolved.

Meanwhile, when the electric power is fed to the outside, the low load operation is carried out for the long time period as described above, and it is thus difficult to remove the accumulated deposits. For this reason, if the same EGR amount as the EGR amount during traveling of the vehicle or more is set during the outside electric power feed, as described in JP 2013-142380 A, the accumulation of the deposits is further promoted.

The present invention suppresses accumulation of deposits in an internal combustion engine during outside electric power feed in a vehicle that can supply electric power to the outside of the vehicle, the electric power being generated by using the internal combustion engine.

A vehicle according to a first aspect of the present invention includes: an internal combustion engine, the internal combustion engine including a recirculation device that recirculates exhaust gas of the internal combustion engine to an intake passage; an electric power output device configured to output electric power generated by using the internal combustion engine to the outside of the vehicle; and an electronic control unit configured to control a recirculation amount of the exhaust gas by the recirculation device in accordance with a load of the internal combustion engine such that, under the same load, the recirculation amount of the exhaust gas is restricted when the electric power output device outputs the electric power to the outside of the vehicle compared to when the electric power output device does not output the electric power to the outside of the vehicle.

According to the above vehicle, during the outside electric power feed in which the electric power generated by using the internal combustion engine is supplied to the outside of the vehicle, the recirculation amount of the exhaust gas (an EGR amount) under the same load is restricted compared to that when the vehicle does not feed the electric power to the outside. For this reason, unburned components in the recirculated exhaust gas that are contained in air-fuel mixture are reduced. Thus, even when the low load operation is carried out for a long time during the outside electric power feed, the accumulation of the deposits in the internal combustion engine can be suppressed. As a result, clogging of an injector or smoking of an ignition plug can be suppressed. Therefore, it is possible to avoid the internal combustion engine from being brought into a state of misfire in advance.

The electronic control unit may be configured to restrict the recirculation amount of the exhaust gas under the same load when i) the electric power output device outputs the electric power to the outside of the vehicle and ii) a fluctuation range of a rotational speed of the internal combustion engine is equal to or higher than a threshold compared to when the electric power output device does not output the electric power to the outside of the vehicle.

With such a configuration, in the case where it is determined from a large fluctuation range of the speed of the internal combustion engine that the clogging of the injector or the smoking of the ignition plug has occurred, the EGR amount is restricted. In other words, in the case where the fluctuation range of the speed of the internal combustion engine is small and it is thus determined that the clogging of the injector or the smoking of the ignition plug has not occurred, the EGR amount is not restricted even during the outside electric power feed. In this way, it is possible to benefit from an effect of the improved fuel economy by the EGR while the internal combustion engine is avoided from being brought into the state of misfire.

The electronic control unit may be configured to restrict the recirculation amount of the exhaust gas under the same load when i) the electric power output device outputs the electric power to the outside of the vehicle and ii) a fluctuation range of an air-fuel ratio in an exhaust gas passage of the internal combustion engine is equal to or higher than a threshold compared to when the electric power output device does not output the electric power to the outside of the vehicle.

With such a configuration, in the case where it is determined from the large fluctuation range of the air-fuel ratio in the exhaust passage that the clogging of the injector or the smoking of the ignition plug has occurred, the EGR amount is restricted. In other words, in the case where the fluctuation range of the air-fuel ratio in the exhaust passage is small and it is thus determined that the clogging of the injector or the smoking of the ignition plug has not occurred, the EGR amount is not restricted even during the outside electric power feed. In this way, it is possible to benefit from the effect of the improved fuel economy by the EGR while the internal combustion engine is avoided from being brought into the state of misfire.

The electronic control unit may be configured to increase a reduced amount of the recirculation amount of the exhaust gas as elapsed time since the electric power output device starts outputting the electric power to the outside of the vehicle is extended.

The accumulation of the deposits is promoted as the operation time under the low load extends. However, with such a configuration, the EGR amount is more restricted as the operation time of the internal combustion engine extends. Therefore, the accumulation of the deposits can effectively be suppressed. On the contrary, when the operation time under the low load is short, the restriction of the EGR amount is alleviated. Thus, the EGR amount can be increased. As a result, the fuel economy can be improved while the accumulation of the deposits is suppressed.

The electronic control unit may be configured to reduce a reduced amount of the recirculation amount of the exhaust gas as the load of the internal combustion engine increases.

With such a configuration, the restriction of the EGR amount is alleviated when the internal combustion engine is operated under a high load with which the deposits are less likely to be accumulated in the internal combustion engine. In other words, the EGR amount can be increased to the same level as that when the vehicle does not feed the electric power to the outside during the operation under the high load. In this way, the effect of the improved fuel economy by the EGR can be attained while the accumulation of the deposits is suppressed.

The electronic control unit may be configured to increase a reduced amount of the recirculation amount of the exhaust gas as the fluctuation range of the rotational speed of the internal combustion engine increases.

With such a configuration, it is determined that a degree of the clogging of the injector or a degree of the smoking of the ignition plug is high as the fluctuation range of the speed of the internal combustion engine is increased, and thus the restriction of the EGR amount is enhanced. Accordingly, further progression of the clogging of the injector or the smoking of the ignition plug is suppressed. Therefore, it is possible to avoid the internal combustion engine from being brought into the state of misfire.

The electronic control unit may be configured to increase a reduced amount of the recirculation amount of the exhaust gas as the fluctuation range of the air-fuel ratio in the exhaust gas passage of the internal combustion engine increases.

With such a configuration, it is determined that that the degree of the clogging of the injector or the degree of the smoking of the ignition plug is high as the fluctuation range of the air-fuel ratio in the exhaust gas passage is increased, and thus the restriction of the EGR amount is enhanced. Thus, the EGR amount is reduced. Accordingly, the further progression of the clogging of the injector or the smoking of the ignition plug is suppressed. Therefore, it is possible to avoid the internal combustion engine from being brought into the state of misfire.

The electronic control unit may be configured to stop actuation of the recirculation device when the electric power output device outputs the electric power to the outside of the vehicle.

With such a configuration, it is possible to further reliably suppress the accumulation of the deposits in the internal combustion engine during the outside electric power feed.

The electronic control unit may be configured to stop actuation of the recirculation device when i) the electric power output device outputs the electric power to the outside of the vehicle and ii) a fluctuation range of a rotational speed of the internal combustion engine is equal to higher than a threshold.

With such a configuration, in the case where it is determined from the large fluctuation range of the speed of the internal combustion engine that the clogging of the injector or the smoking of the ignition plug has occurred, the exhaust gas is not recirculated. Therefore, it is possible to further reliably suppress the further progression of the clogging of the injector or the smoking of the ignition plug.

The electronic control unit may be configured to stop actuation of the recirculation device when i) the electric power output device outputs the electric power to the outside of the vehicle and ii) the fluctuation range of the air-fuel ratio in the exhaust passage of the internal combustion engine is equal to or higher than the threshold.

With such a configuration, in the case where it is determined from the large fluctuation range of the air-fuel ratio in the exhaust passage that the clogging of the injector or the smoking of the ignition plug has occurred, the exhaust gas is not recirculated. Therefore, it is possible to further reliably suppress the further progression of the clogging of the injector or the smoking of the ignition plug.

A control method for vehicle according to a second aspect of the present invention, the vehicle including an internal combustion engine, the internal combustion engine including a recirculation device that recirculates exhaust gas of the internal combustion engine to an intake passage, and an electric power output device configured to output electric power generated by using the internal combustion engine to the outside of the vehicle. The control method includes: determining whether or not a request for the electric power output device to output the electric power to the outside of the vehicle is made; setting a recirculation amount of exhaust gas by the recirculation device in accordance with a load of the internal combustion engine; and restricting, under the same load, the recirculation amount of the exhaust gas when the electric power output device outputs the electric power to the outside of the vehicle compared to when the electric power output device does not output the electric power to the outside of the vehicle.

According to the above control method for the vehicle, during the outside electric power feed in which the electric power generated by using the internal combustion engine is supplied to the outside of the vehicle, the recirculation amount of the exhaust gas (the EGR amount) under the same load is restricted compared to that when the vehicle does not feed the electric power to the outside. Thus, even when the low load operation is carried out for a long time during the outside electric power feed, the accumulation of the deposits in the internal combustion engine can be suppressed. As a result, the clogging of the injector or the smoking of the ignition plug can be suppressed. Therefore, it is possible to avoid the internal combustion engine from being brought into the state of misfire in advance.

According to the aspects of the present invention, it is possible to suppress the accumulation of the deposits in the internal combustion engine during the outside electric power feed in the vehicle that can supply the electric power generated by using the internal combustion engine to the outside of the vehicle. In this way, the clogging of the injector or the smoking of the ignition plug can be suppressed. Therefore, it is possible to avoid the internal combustion engine from being brought into the state of misfire in advance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
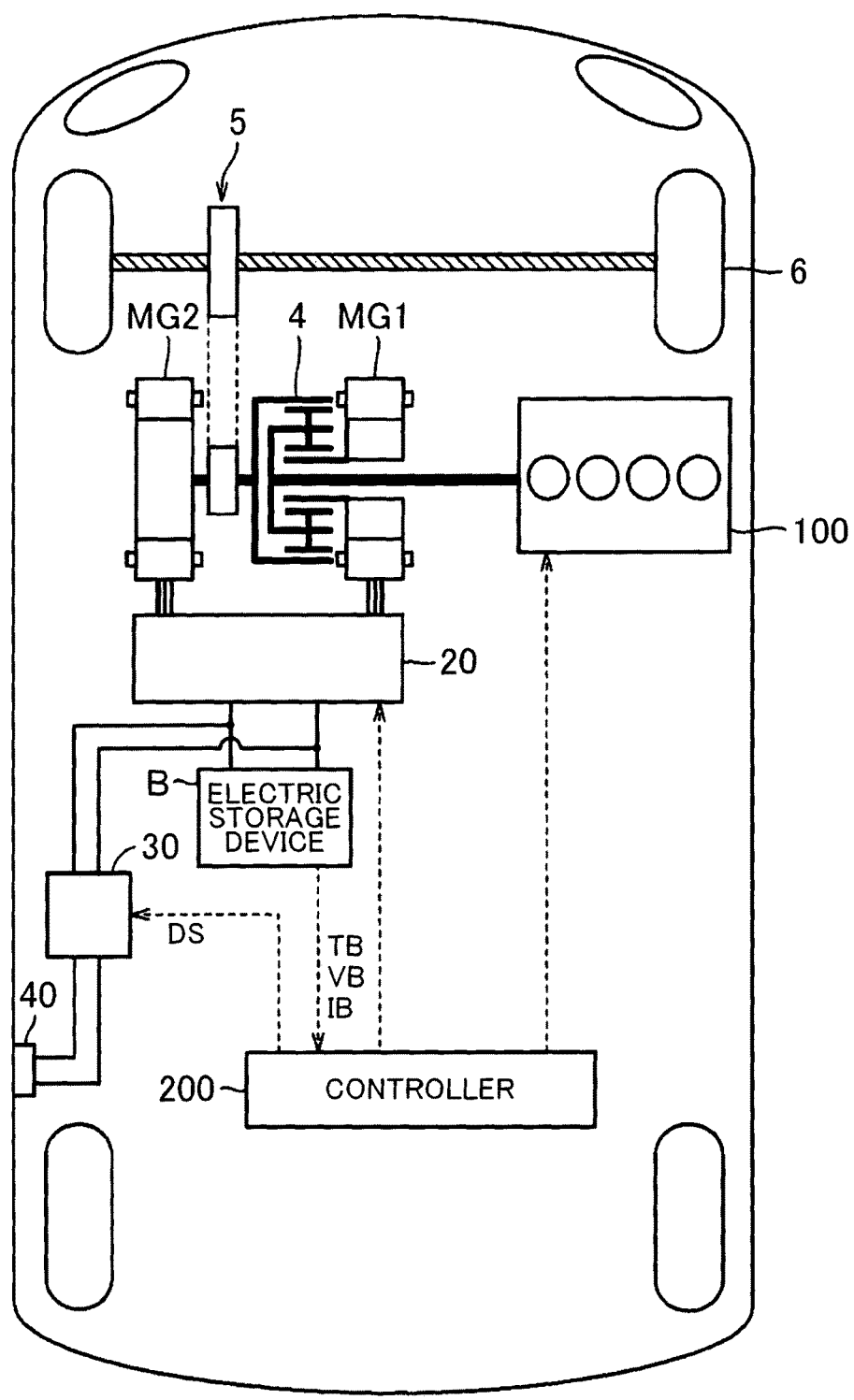
FIG. 1 is a block diagram of an overall configuration of a hybrid vehicle that is shown as a representative example of a vehicle according to a first embodiment of the present invention.

A detailed description will hereinafter be made on embodiments of the present invention with reference to the drawings. The plural embodiments will be described below. However, it has been planned since the time of application to appropriately combine configurations, each of which will be described in each of the embodiments. Noted that the same or corresponding portions in the drawings are denoted by the same reference numerals, and the description thereof will not be repeated.

First Embodiment (Overall Configuration of Hybrid Vehicle)

FIG. 1 is a block diagram of an overall configuration of a hybrid vehicle 1 that is shown as a representative example of the vehicle according to a first embodiment of the present invention. Referring to FIG. 1, the hybrid vehicle 1 includes an engine 100, motor generators MG1, MG2, a power dividing mechanism 4, a reducer 5, and drive wheels 6. The hybrid vehicle 1 further includes an electric storage device B, a power control unit (PCU) 20, a voltage converter 30, an outside electric power feed port 40, and a controller 200.

The hybrid vehicle 1 can travel by a drive force that is output from at least one of the engine 100 and the motor generator MG2. The power dividing mechanism 4 is configured to be able to divide the drive force that is generated by the engine 100 into a drive force for driving the drive wheels 6 and a drive force for driving the motor generator MG1. The power dividing mechanism 4 is configured by including a planetary gear train, for example.

The engine 100 is configured by including an internal combustion engine such as a gasoline engine or a diesel engine. The engine 100 has a recirculation device (an EGR device) for recirculating some of exhaust gas to an intake side. The controller 200 controls a recirculation amount (an EGR amount) of the exhaust gas in the EGR device in accordance with an operation state of the engine 100 or whether outside electric power feed is requested. Configurations of the engine 100 and the EGR device will be described in detail below.

Each of the motor generators MG1, MG2 is an AC rotating electric machine, and is a three-phase AC synchronous electric motor generator, for example. The motor generator MG1 uses the drive force of the engine 100, which is transmitted through the power dividing mechanism 4, and is operated as an electric generator. For example, once a charged state (hereinafter also referred to as a "state of charge (SOC)") of the electric storage device B reaches a specified lower limit, the engine 100 is started, and electric power is generated by the motor generator MG1. A voltage of the electric power generated by the motor generator MG1 is converted by the PCU 20. Then, the generated electric power is either stored in the electric storage device B or directly supplied to the motor generator MG2. In addition, during the outside electric power feed, the voltage of the electric power generated by the motor generator MG1 is further converted by the voltage converter 30. Then, the generated electric power is supplied from the outside electric power feed port 40 to the outside of the vehicle.

The motor generator MG2 generates the drive force by using at least one of the electric power stored in the electric storage device B and the electric power generated by the motor generator MG1. The drive force of the motor generator MG2 is transmitted to the drive wheels 6 via the reducer 5. Noted that the drive wheels 6 are shown as front wheels in FIG. 1; however, instead of the front wheels, or together with the front wheels, rear wheels may be driven by the motor generator MG2.

During braking of the hybrid vehicle 1, the motor generator MG2 is driven by the drive wheels 6 via the reducer 5. Thus, the motor generator MG2 operates as the electric generator. A voltage of the generated electric power by the motor generator MG2 is converted by the PCU 20. Then, the generated electric power can be stored in the electric storage device B.

The PCU 20 is a drive device for driving the motor generators MG1, MG2. The PCU 20 possibly includes an inverter for driving the motor generators MG1, MG2, and further possibly includes a converter that converts the voltage between the inverter and the electric storage device B.

The electric storage device B is an electric power storage element that is configured to be rechargeable. The electric storage device B is configured by including a secondary battery, such as a nickel hydrogen battery or a lithium ion battery, or a cell of an electric storage element, such as an electric double layer capacitor, for example. The electric storage device B is provided with a sensor (not shown) for detecting a temperature TB, a current IB, and a voltage VB of the electric storage device B. A detected value by the sensor is output to the controller 200. On the basis of the detected value by the sensor, the controller 200 calculates the SOC of the electric storage device B.

The voltage converter 30 is driven by a drive signal DS that is received from the controller 200 when the electric power is fed to the outside. Accordingly, the voltage converter 30 converts the voltage of the electric power that is received from at least one of the electric storage device B and the PCU 20, and transmits the electric power to the outside electric power feed port 40. More specifically, when the voltage converter 30 receives the electric power that is generated by the motor generator MG1 by using the drive force of the engine 100 either directly from the PCU 20 or from the electric storage device B that temporarily stores the generated electric power, the voltage converter 30 converts the voltage of the generated electric power for the outside electric power feed, and then transmits the electric power to the outside electric power feed port 40. The voltage converter 30 is configured by including an inverter, for example. Noted that the voltage converter 30 may be configured to be able to convert the voltage in a bidirectional manner. Thus, the voltage converter 30 may convert the voltage of the electric power that is supplied from an electric power supply on the outside of the vehicle and input from the outside electric power feed port 40, so as to be able to charge the electric storage device B. In other words, the outside electric power feed port 40 constitutes an electric power interface that is used to supply the electric power to the outside of the vehicle during the outside electric power feed.

Representatively, the controller 200 is configured by including an electronic control unit (ECU). The ECU includes a central processing unit (CPU), a memory area such as a random access memory (RAM) and a read only memory (ROM), and an input/output interface (none of them is shown) as main components. The controller 200 executes control related to the traveling of the hybrid vehicle 1 and charging/discharging of the electric storage device B when the CPU reads out a program, which is stored in advance in the ROM or the like, in the RAM and executes the program. The controller 200 further executes control of the engine 100 including the EGR device and outside electric power feed control by the voltage converter 30. Noted that at least a part of the ECU may be configured to execute specified arithmetic and logical operation processing by using hardware such as an electronic circuit.

(Configuration of the Engine 100)

Figure 2:
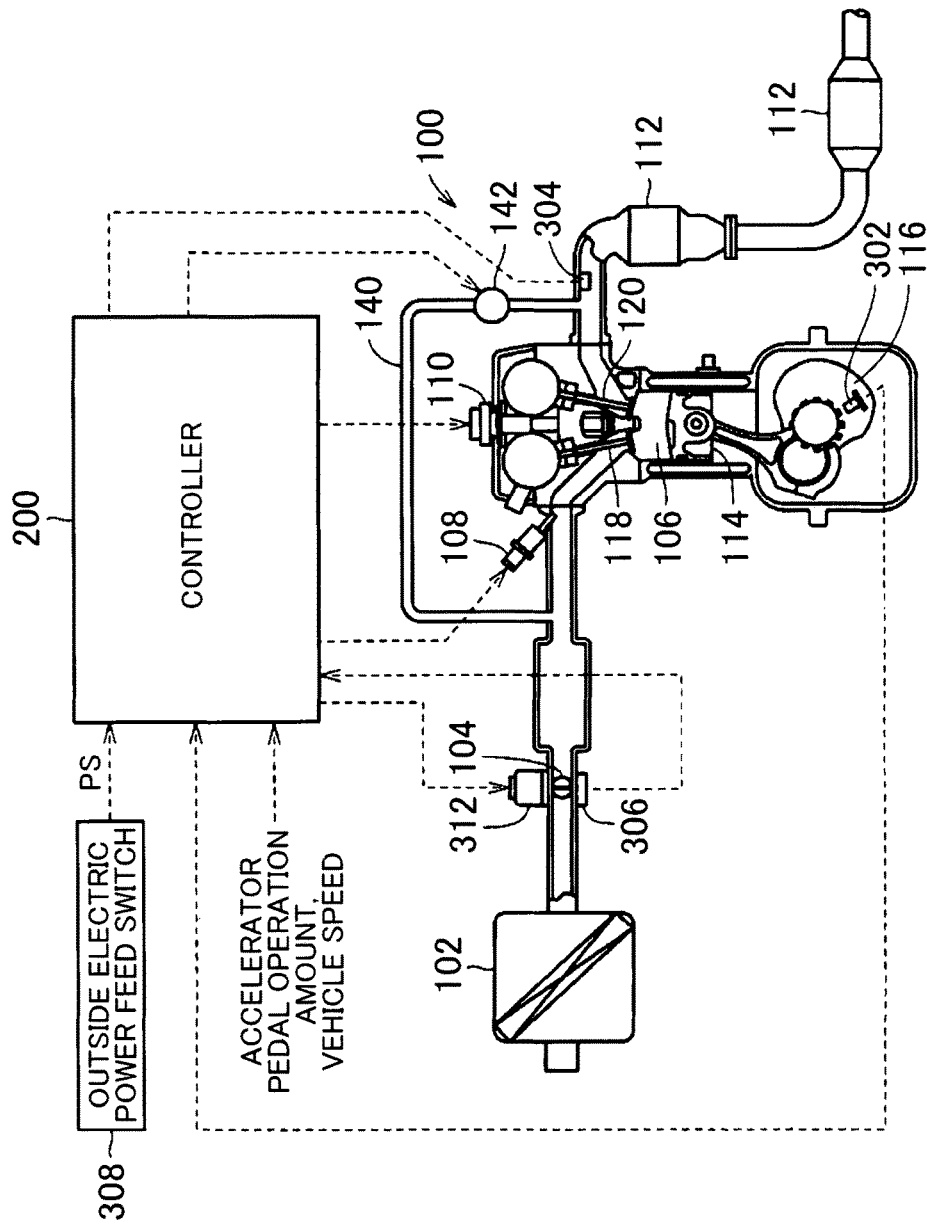
FIG. 2 shows a configuration of an engine shown in FIG. 1.

FIG. 2 shows a configuration of the engine 100 that is shown in FIG. 1. Referring to FIG. 2, the air is suctioned from an air cleaner 102 into the engine 100. An amount of the suctioned air is adjusted by a throttle valve 104. The throttle valve 104 is driven by a throttle motor 312.

The suctioned air is mixed with fuel in a cylinder (combustion chamber) 106. The fuel is injected from an injector 108 to the cylinder 106. Then, air-fuel mixture in the cylinder 106 is ignited by an ignition plug 110 and combusted. The air-fuel mixture after combustion, that is, exhaust gas is purified by a three-way catalyst 112, and is then discharged to the outside of the vehicle. A piston 114 is pushed down by combustion of the air-fuel mixture, and a crankshaft 116 thereby rotates.

A top of the cylinder 106 is provided with an intake valve 118 and an exhaust valve 120. The intake valve 118 controls an amount and timing of the air that is introduced into the cylinder 106. The exhaust valve 120 controls an amount and timing of the exhaust gas that is discharged from the cylinder 106.

The engine 100 includes the EGR device. The EGR device includes an EGR passage 140 and an EGR valve 142. The EGR passage 140 is a pipeline for recirculating the exhaust gas of the engine 100 to the intake side (for example, an intake manifold). The EGR valve 142 is provided in the EGR passage 140, and opening/closing thereof is controlled by the controller 200. When the EGR valve 142 is opened, the EGR passage 140 communicates between an exhaust passage and an intake passage. When the EGR valve 142 is closed, the EGR passage 140 is blocked. When the EGR valve 142 is opened and the exhaust gas is recirculated to the intake passage, a combustion temperature is lowered. Thus, generation of nitrogen oxide (NOx) is suppressed. In addition, negative pressure of the intake manifold is lowered by introduction of the exhaust gas. Thus, pumping loss is reduced, and fuel economy can be improved.

The controller 200 controls an opening degree of the throttle valve 104 (a throttle opening degree), ignition timing, fuel injection timing, a fuel injection amount, and the like so as to bring the engine 100 into a desired operation state. More specifically, the controller 200 adjusts the ignition timing by outputting a control signal to the ignition plug 110, adjusts the throttle opening degree by outputting a control signal to the throttle valve 104, and opens a nozzle of the injector 108 at specified timing for a specified time period by outputting a control signal to the injector 108.

The controller 200 receives signals from a crank angle sensor 302, a throttle opening degree sensor 306, an A/F sensor 304, an accelerator pedal sensor, and a vehicle speed sensor. The crank angle sensor 302 outputs a signal indicative of a rotational speed of the crankshaft 116 (an engine speed) and a rotational angle of the crankshaft 116. The throttle opening degree sensor 306 outputs a signal indicative of the throttle opening degree. The A/F sensor 304 outputs a signal indicative of an air-fuel ratio A/F in an exhaust gas passage. The accelerator pedal sensor detects an operation amount of an accelerator pedal by a driver and outputs a signal indicative of the detected operation amount. The vehicle speed sensor detects a vehicle speed of the hybrid vehicle 1 and outputs a signal indicative of the detected vehicle speed.

In addition, the controller 200 receives a signal PS from an outside electric power feed switch 308. The outside electric power feed switch 308 is a switch used by a user to request the outside electric power feed. When the outside electric power feed switch 308 is operated to be ON, the signal PS is activated. Noted that, regarding the outside electric power feed request, it may be determined that the outside electric power feed is requested in a case where the outside electric power feed switch 308 is not provided and an electric power feed connector is connected to the outside electric power feed port 40, a case where an electric power feed request signal is received from the electric power feed connector that is connected to the outside electric power feed port 40, or the like. The controller 200 controls the engine 100 on the basis of the signals from various types of the sensors and the outside electric power feed switch 308.

(Configuration of the Controller 200)

Figure 3:
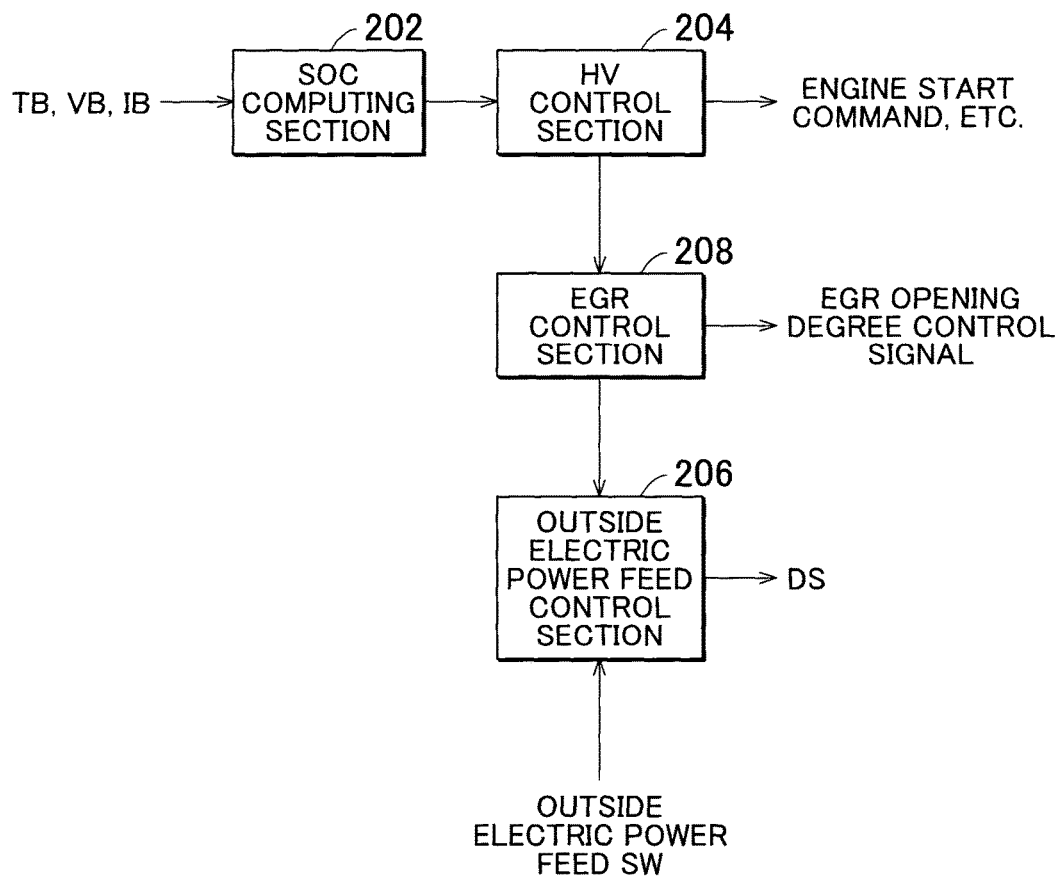
FIG. 3 is a functional block diagram of a controller shown in FIG. 1 and FIG. 2.

FIG. 3 is a functional block diagram of the controller 200 shown in FIG. 1 and FIG. 2. Of functions of the controller 200, FIG. 3 shows functional blocks of a function that relates to the control of the engine 100.

Referring to FIG. 3, the controller 200 includes a SOC computing section 202, a HV control section 204, an outside electric power feed control section 206, and an EGR control section 208. The SOC computing section 202 computes the SOC of the electric storage device B on the basis of detected values of the temperature TB, the current IB, and the voltage VB of the electric storage device B. Noted that any of various known methods can be used as a computing method of the SOC.

The HV control section 204 executes overall control of the hybrid vehicle 1. As a representative example of the control, the HV control section 204 generates an engine start command and starts the engine 100 when power requested for the hybrid vehicle 1 exceeds a threshold (an engine start threshold) or when the SOC of the electric storage device B becomes lower than the specified lower limit during execution of an EV travel in which the hybrid vehicle 1 travels by the output of the motor generator MG2 while the engine 100 is stopped. Then, while the engine 100 is actuated, the HV control section 204 controls the throttle opening degree, the ignition timing, the fuel injection timing, the fuel injection amount, and the like so that the engine 100 operates at a desired operation point.

The outside electric power feed control section 206 sets an operation mode of the hybrid vehicle 1 in an outside electric power feed mode in the case where the outside electric power feed switch 308 (FIG. 2) is operated to be ON while the hybrid vehicle 1 is stopped. Then, in the outside electric power feed mode, the outside electric power feed control section 206 generates a drive signal DS for driving the voltage converter 30 (FIG. 1) and outputs the signal to the voltage converter 30. In addition, in the outside electric power feed mode, the outside electric power feed control section 206 notifies the EGR control section 208 that the hybrid vehicle 1 is in the outside electric power feed mode.

The EGR control section 208 controls opening/closing of the EGR valve 142. More specifically, the EGR control section 208 controls the recirculation amount of the exhaust gas (the EGR amount) by adjusting an opening degree of the EGR valve 142 (hereinafter also referred to as an "EGR opening degree") in accordance with a load of the engine 100. Further more specifically, during HV travel in which the hybrid vehicle 1 travels with the engine 100 being actuated, the EGR control section 208 controls the EGR opening degree in accordance with the operation point that is defined by combination of the load and the speed of the engine 100. A completely opened state (the EGR opening degree of 100%) and a completely closed state (the EGR opening degree of 0%) are included in the control of the EGR opening degree. For example, the EGR control section 208 computes a target value of the EGR opening degree by referring to an opening degree map. The opening degree map defines the EGR opening degree at each operation point in advance. The opening degree map is stored in the ROM or the like in the controller 200 in advance. Noted that, on the basis of an experiment result or the like, a map value of the opening degree map is adapted to conform to the EGR opening degree in advance such that fuel economy becomes optimum at the operation point, the EGR opening degree corresponding to a parameter value indicative of the operation point of the engine 100. The EGR control section 208 controls the EGR opening degree in accordance with the target value.

As described above, in the case where the required load of the engine 100 is changed while the hybrid vehicle 1 travels in a HV travel mode, the target value of the EGR opening degree corresponds to the change of the load and thus is changed. The EGR control section 208 controls the EGR opening degree (that is, the EGR amount) in a way to follow the change of the target value. In this way, the fuel economy of the hybrid vehicle 1 can be improved.

Meanwhile, when the operation mode of the hybrid vehicle 1 is the outside electric power feed mode, the engine 100 is operated for a long time period under a relatively lower load than the load during the above-described HV travel mode. Generally, when the EGR device is actuated under the low load of the engine 100, the unburned fuel that is contained in the exhaust gas recirculated to the intake side tends to be adhere to an injection opening of the injector 108 or the ignition plug 110 and be accumulated. Thus, if the same control of the EGR amount as that in the HV travel mode is executed in the outside electric power feed mode, the accumulation of the deposits is promoted and induces clogging of the injector 108 or smoking of the ignition plug 110. As a result, a combustion state of the engine 100 becomes unstable, which further may lead to a state of misfire.

In view of the above, in this first embodiment, in comparison with a case where the hybrid vehicle 1 is not in the outside electric power feed mode, the EGR control section 208 restricts the EGR amount with respect to the same engine load in the outside electric power feed mode. In this way, unburned components in the recirculated exhaust gas contained in the air-fuel mixture is reduced. Thus, even when the low load operation is carried out for a long time period in the outside electric power feed mode, it is possible to suppress the deposits from being accumulated in the engine 100. As a result, the clogging of the injector 108 and the smoking of the ignition plug 110 can be suppressed. Therefore, it is possible to avoid the engine 100 from being brought into the state of misfire in advance.

In order to distinguish two types of the control of the EGR amount, in the following description, the control of the EGR amount in the case where the hybrid vehicle 1 is not in the outside electric power feed mode is also described as "EGR normal control" and the control of the EGR amount in the case where the hybrid vehicle 1 is in the outside electric power feed mode is also described as "EGR restricted control".

Figure 4:
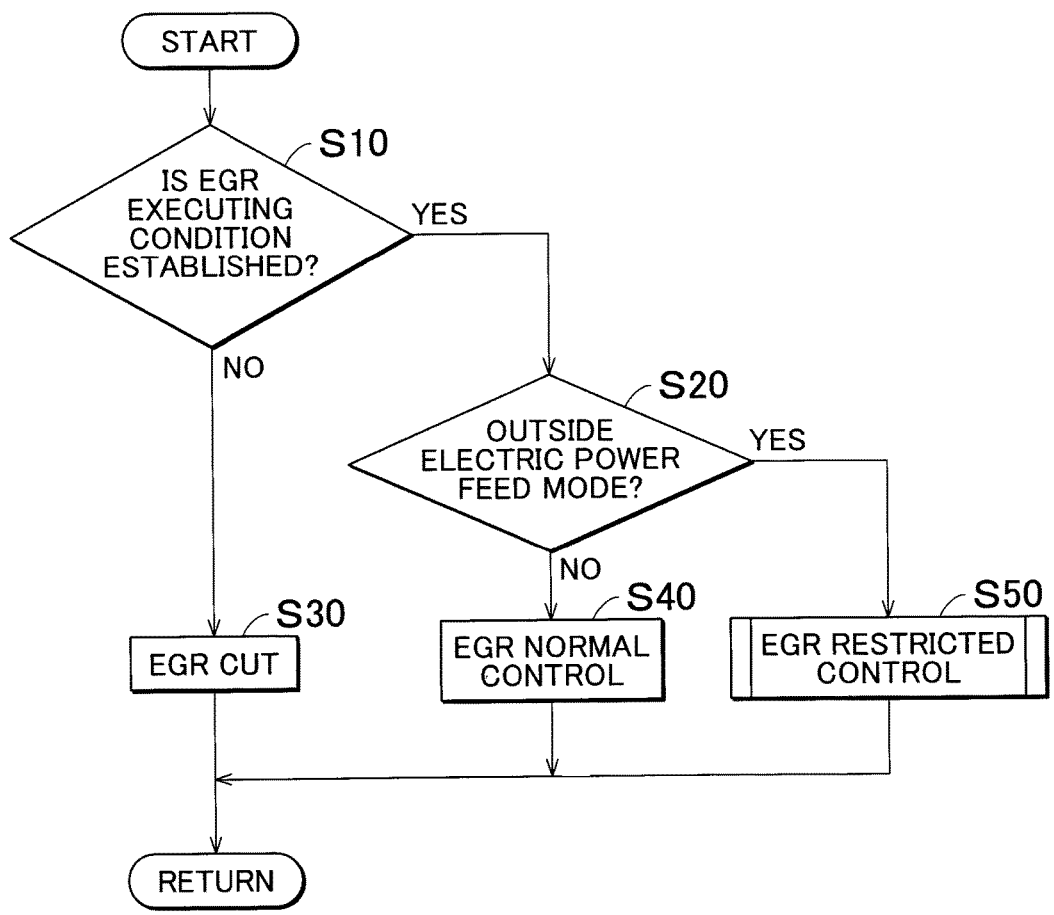
FIG. 4 is a flowchart for illustrating control of an EGR amount by the controller.

FIG. 4 is a flowchart for illustrating the control of the EGR amount by the controller 200. This flowchart is realized when a pre-stored program in the controller 200 is executed at specified intervals. Alternatively, some of the steps can be processed by building dedicated hardware (an electronic circuit) therefor.

Referring to FIG. 4, the controller 200 first determines whether a specified EGR executing condition for recirculating the exhaust gas by the EGR device has been established (step S10). Representative examples of the EGR executing condition include: (1) a specified time period has elapsed since the engine startup or recovery from fuel cut; (2) volumetric efficiency of the engine 100 is a specified value or higher; (3) the hybrid vehicle 1 does not idle; (4) a coolant temperature of the engine 100 is a specified temperature or higher; and (5) fuel is not increased.

If all of these EGR executing conditions are established and thus the exhaust gas can be recirculated (if it is determined YES in step S10), the controller 200 permits the actuation of the EGR device. On the other hand, if any of the EGR executing conditions is not established and thus the exhaust gas cannot be recirculated (if it is determined NO in step S10), the controller 200 stops the actuation of the EGR device (EGR cut) (step S30). More specifically, the controller 200 completely closes the EGR valve 142 (the EGR opening degree is 0%).

If the actuation of the EGR device is permitted (if it is determines YES in step S10), the controller 200 next determines whether the operation mode of the hybrid vehicle 1 is the outside electric power feed mode (step S20). If it is determined that the operation mode is not the outside electric power feed mode (if it is determined NO in step S20), the controller 200 executes the EGR normal control (step S40). In other words, the controller 200 refers to the above-described opening degree map and determines the target value of the EGR opening degree in accordance with the operation point that is defined by the load and the speed of the engine 100. Then, the controller 200 controls the EGR opening degree in accordance with the target value.

On the other hand, if it is determined that the operation mode is the outside electric power feed mode (if it is determined YES in step S20), the controller 200 executes the EGR restricted control (step S50). More specifically, in comparison with the case where the EGR normal control is executed, the controller 200 restricts the target value of the EGR opening degree at the same operation point of the engine 100. In this way, the controller 200 reduces the EGR amount in the outside electric power feed mode, so as to suppress the accumulation of the deposits.

(The EGR Restricted Control)

A detailed description will hereinafter be made on an example of the EGR restricted control in step S50 shown in FIG. 4.

Figure 5:
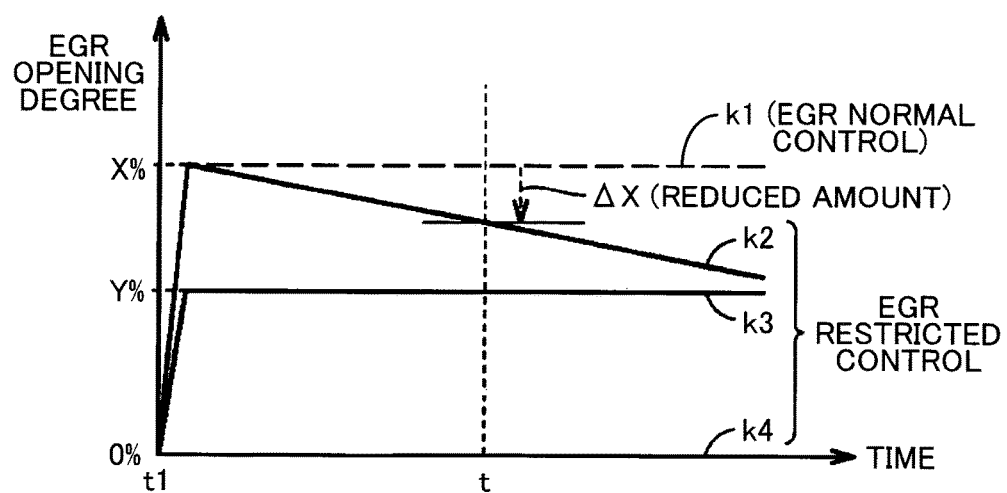
FIG. 5 is a timing chart that shows a change in an EGR opening degree in an outside electric power feed mode.

FIG. 5 is a timing chart that shows a change in the EGR opening degree in the outside electric power feed mode. Referring to FIG. 5, a broken line k1 represents a change in the EGR opening degree when the EGR normal control is executed. Solid lines k2 to k4 represent changes in the EGR opening degree when the EGR restricted control is executed. Noted that the broken line k1 and the solid lines k2 to k4 each represents the change in the EGR opening degree under the same engine load.

In the outside electric power feed mode, the engine 100 is started when the SOC of the electric storage device B becomes lower than the specified lower limit (time W. Once the EGR device is actuated, the EGR control section 208 (FIG. 3) controls the EGR opening degree in accordance with the load of the engine 100. Noted that, as described above, during the execution of the EGR normal control, the EGR control section 208 refers to the opening degree map to compute the target value of the EGR opening degree at the operation point of the engine 100. Then, the EGR control section 208 controls the EGR opening degree in accordance with the target value (corresponding to X % in the drawing).

Meanwhile, in the EGR restricted control, the EGR control section 208 restricts the target value of the EGR opening degree at the desired operation point to be smaller than a map value in the opening degree map. Accordingly, in the EGR restricted control, the EGR opening degree at the same operation point is controlled to be smaller than that in the EGR normal control. In the following description, a difference between the EGR opening degree in the EGR normal control and the EGR opening degree in the EGR restricted control at the same operation point (corresponding to ΔX in the drawing) is also referred to as "a reduced amount of the EGR opening degree".

In the EGR restricted control, the EGR control section 208 can change the reduced amount of the EGR opening degree in accordance with elapsed time since the start of the engine 100. More specifically, as shown by the solid line k2 in FIG. 5, as the elapsed time since the start of the engine 100 extends, the EGR control section 208 increases the reduced amount of the EGR opening degree. In other words, as the elapsed time since the start of the engine 100 extends, the EGR control section 208 reduces the EGR opening degree. This is because the accumulation of the deposits is promoted as the operation time under the low load extends, and thus the EGR amount is more restricted as the operation time under the low load extends. Therefore, the accumulation of the deposits can effectively be suppressed. On the contrary, when the operation time under the low load is short, the restriction of the EGR amount is alleviated. Thus, an effect of the improved fuel economy by the EGR can be attained. As a result, the fuel economy can be improved while the accumulation of the deposits is suppressed.

Alternatively, as indicated by the solid line k3 in FIG. 5, the EGR control section 208 may fix the EGR opening degree to a specified value (corresponding to Y % in the drawing) in the outside electric power feed mode. This specified value Y % is fitted in advance on the basis of an experimental result or the like such that the accumulation of the deposits can be suppressed in the outside electric power feed mode even when the assumed load is the smallest value. In this way, even in the outside electric power feed mode, the effect of the improved fuel economy by the EGR can be attained in a limit capable of suppressing the accumulation of the deposits.

Further alternatively, as indicated by the solid line k4 in FIG. 5, the EGR control section 208 may stop the actuation of the EGR device (the EGR cut) in the outside electric power feed mode. It is possible by completely closing the EGR valve 142 (the EGR opening degree is 0%) to reliably suppress the accumulation of the deposits in the outside electric power feed mode.

Figure 6:
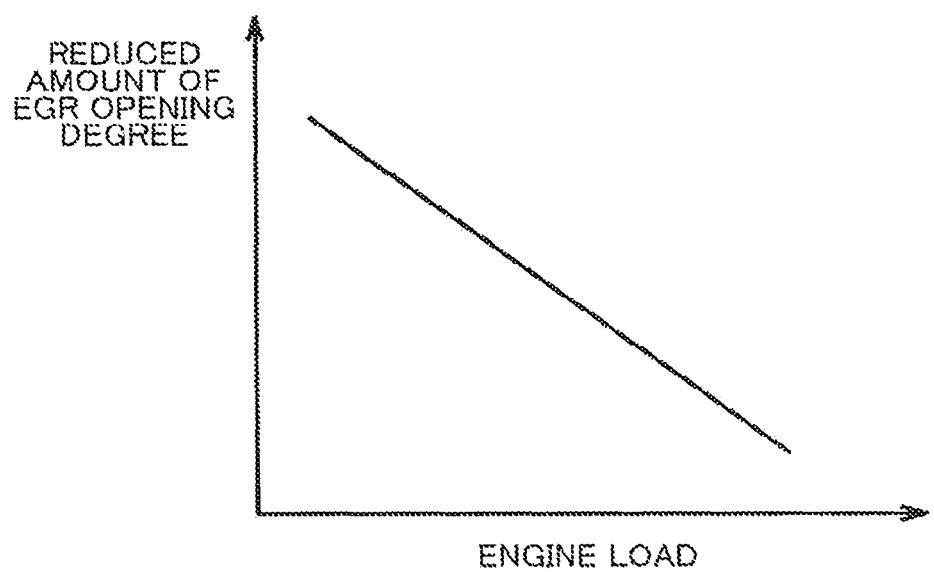
FIG. 6 is a schematic graph for illustrating a relationship between a load of the engine and a reduced amount of the EGR opening degree.

Noted that, of the above-mentioned examples of the EGR restricted control, in the example of changing the reduced amount of the EGR opening degree in the outside electric power feed mode, a configuration that the reduced amount of the EGR opening degree is changed in accordance with the load of the engine 100 can be adopted in addition to a configuration that the reduced amount of the EGR opening degree is changed in accordance with the elapsed time since the start of the engine 100. FIG. 6 is a schematic graph for illustrating a relationship between the load of the engine 100 and the reduced amount of the EGR opening degree. Referring to FIG. 6, the EGR control section 208 reduces the reduced amount of the EGR opening degree as the load of the engine 100 is increased. That is, the EGR control section 208 alleviates the restriction of the EGR amount as the load of the engine 100 is increased.

When the load of the engine 100 is high, the combustion temperature is increased, and the amount of the unburned fuel that is contained in the exhaust gas is reduced. Thus, even if the EGR device is actuated in such a case, the deposits are less likely to be accumulated. For this reason, in such a case, the restriction of the EGR amount is alleviated. In other words, the EGR amount is increased to the same level as that in the EGR normal control. In this way, the effect of the improved fuel economy by the EGR can be attained while the accumulation of the deposits is suppressed.

As described above, according to the vehicle in this first embodiment, the EGR amount under the same engine load is restricted in the outside electric power feed mode when compared to the case where the vehicle is not in the outside electric power feed mode. Thus, even when the low load operation is carried out for a long time during the outside electric power feed, the accumulation of the deposits in the engine 100 can be suppressed. As a result, the clogging of the injector 108 and the smoking of the ignition plug 110 can be suppressed. Therefore, it is possible to avoid the engine 100 from being brought into the state of misfire in advance.

Second Embodiment

In the first embodiment, the description has been made on the configuration that the EGR restricted control is executed in the outside electric power feed mode. Although the accumulation of the deposits can be suppressed by restricting the EGR amount during the outside electric power feed, there is a possibility that the effect of the improved fuel economy by the EGR is weakened. In other words, the active use of the EGR device under a condition that the clogging of the injector 108 and the smoking of the ignition plug 110 are avoided is advantageous for improving the fuel economy.

In the second embodiment, a description will be made on the EGR restricted control that can further improve the fuel economy. Noted that, since the overall configuration of the vehicle according to the second embodiment of the present invention is the same as that in FIG. 1, the detailed description thereon will not be repeated. In addition, the configuration of the control of the engine 100 is the same as that in FIG. 3 and FIG. 4 except for the control of the EGR amount by the controller 200 (the EGR control section 208). Thus, the detailed description thereon will not be repeated.

Figure 7:
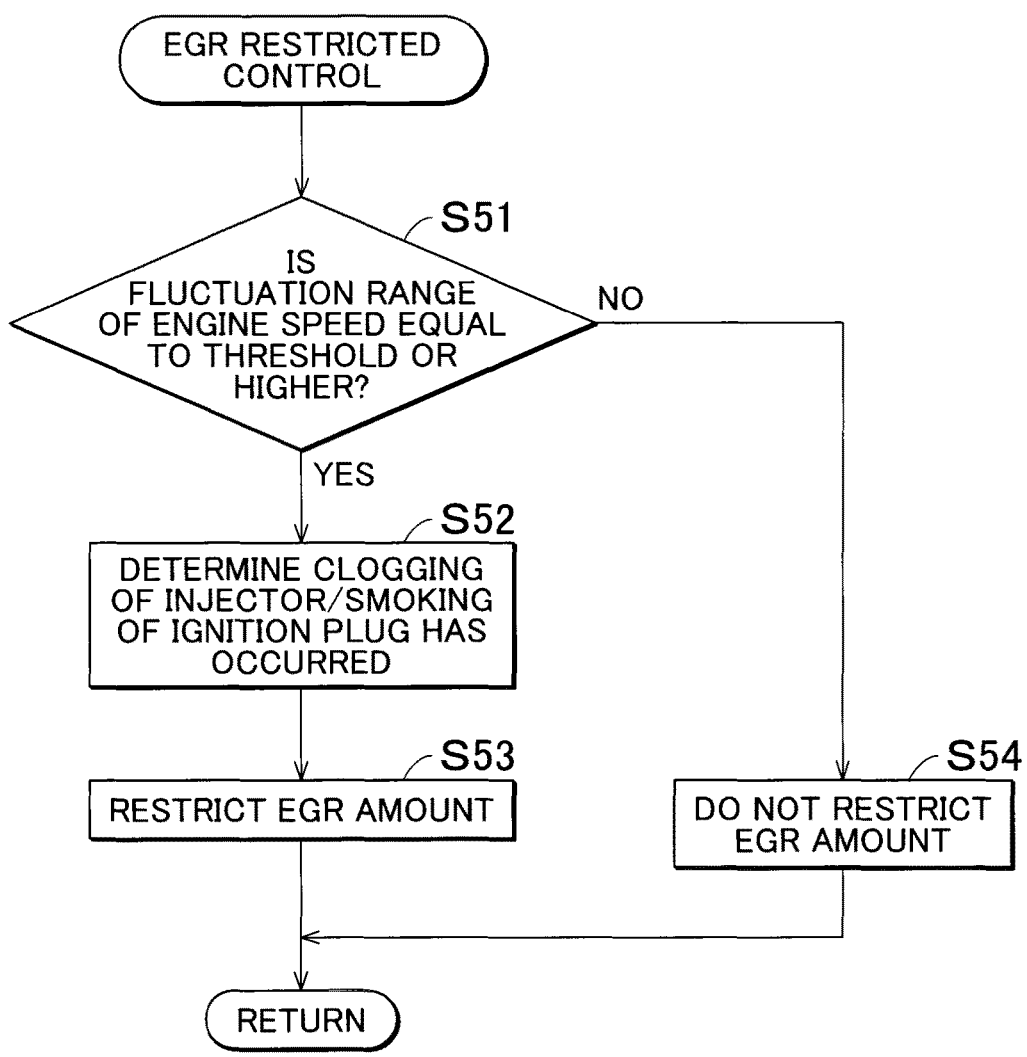
FIG. 7 is a flowchart for illustrating characteristics of EGR restricted control in an outside electric power feed mode in a vehicle according to a second embodiment of the present invention.

FIG. 7 is a flowchart for illustrating characteristics of the EGR restricted control in the outside electric power feed mode in the vehicle according to the second embodiment of the present invention. In the EGR restricted control in the outside electric power feed mode according to the second embodiment, step S50 (the EGR restricted control) in the flowchart of FIG. 4 is executed in accordance with the flowchart of FIG. 7. Since the other control operations only need to be carried out in the same manner as those in the first embodiment, the detailed description thereof will not be repeated.

Referring to FIG. 7, if the operation mode is the outside electric power feed mode, the EGR control section 208 determines whether the clogging of the injector 108 or the smoking of the ignition plug 110 has not occurred. This determination can be made by monitoring a fluctuation in the speed of the engine 100, for example. More specifically, when the fuel injection amount is reduced by the clogging of the injector 108, the combustion in the combustion chamber becomes slow, and thus the combustion state becomes unstable. As a result, the speed of the engine 100 is fluctuated greatly. The same phenomenon may occur when the ignition cannot be carried out normally due to the smoking of the ignition plug 110.

The EGR control section 208 monitors the fluctuation in the speed of the engine 100 on the basis of the signal from the crank angle sensor 302 (FIG. 2). The EGR control section 208 compares a fluctuation range of the speed of the engine 100 and a threshold thereof (step S51). If the fluctuation range of the speed is equal to the threshold or higher (if it is determined YES in step S51), the EGR control section 208 determines that the clogging of the injector 108 or the smoking of the ignition plug 110 has occurred (step S52).

When the clogging of the injector 108 or the smoking of the ignition plug 110 has occurred, the EGR control section 208 restricts the EGR amount under the same engine load in comparison with the case where the vehicle is not in the outside electric power feed mode (step S53). As shown by the solid lines k2 to k4 in FIG. 5 and also shown in FIG. 6, the EGR control section 208 controls the EGR opening degree at the same operation point to be lower than that in the EGR normal control (including the EGR cut).

Figure 8:
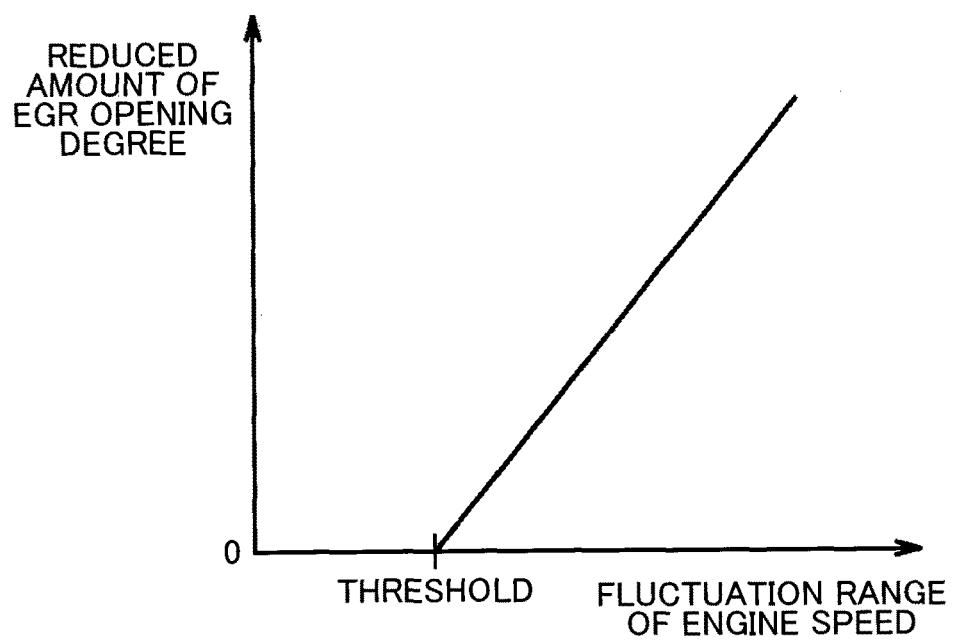
FIG. 8 is a schematic graph for illustrating a relationship between a fluctuation range of a speed of the engine and the reduced amount of the EGR opening degree.

Noted that, in the second embodiment, it may be configured that the reduced amount of the EGR opening degree is changed in accordance with a magnitude of the fluctuation range of the speed of the engine 100. FIG. 8 is a schematic graph for illustrating a relationship between the fluctuation range of the speed of the engine 100 and the reduced amount of the EGR opening degree. Referring to FIG. 8, the EGR control section 208 increases the reduced amount of the EGR opening degree as the fluctuation range of the speed of the engine 100 is increased. That is, the EGR control section 208 determines that a degree of the clogging of the injector 108 or a degree of the smoking of the ignition plug 110 is high as the fluctuation range of the speed of the engine 100 is increased, and thus the restriction of the EGR amount is enhanced. Accordingly, further progression of the clogging of the injector 108 or the smoking of the ignition plug 110 is suppressed. Therefore, it is possible to avoid the engine 100 from being brought into the state of misfire.

Returning to FIG. 7, if the fluctuation range of the speed of the engine 100 is smaller than the threshold (if it is determined NO in step S51), the EGR control section 208 determines that neither the clogging of the injector 108 nor the smoking of the ignition plug 110 has occurred. In this case, the EGR control section 208 does not restrict the EGR amount as described above (step S54). Thus, the EGR control section 208 executes the EGR normal control and thereby controls the EGR opening degree in accordance with the operation point of the engine 100.

Noted that, instead of the processing in step S54, the EGR control section 208 may restrict the EGR amount even when neither the clogging of the injector 108 nor the smoking of the ignition plug 110 has occurred, and may alleviate the restriction of the EGR amount in comparison with the case where the clogging of the injector 108 or the smoking of the ignition plug 110 has occurred. The above processing is preferred in a point that the accumulation of the deposits can be suppressed.

Modified Example of the Second Embodiment

Whether the clogging of the injector 108 or the smoking of the ignition plug 110 has occurred can also be determined by monitoring a fluctuation of the air-fuel ratio A/F in the exhaust gas passage. When the clogging of the injector 108 or the smoking of the ignition plug 110 occurs, the control of the fuel injection amount or the ignition timing becomes unstable. This further leads to the unstable air-fuel ratio of the air-fuel mixture that is combusted in the combustion chamber, and the air-fuel ratio fluctuates greatly.

Figure 9:
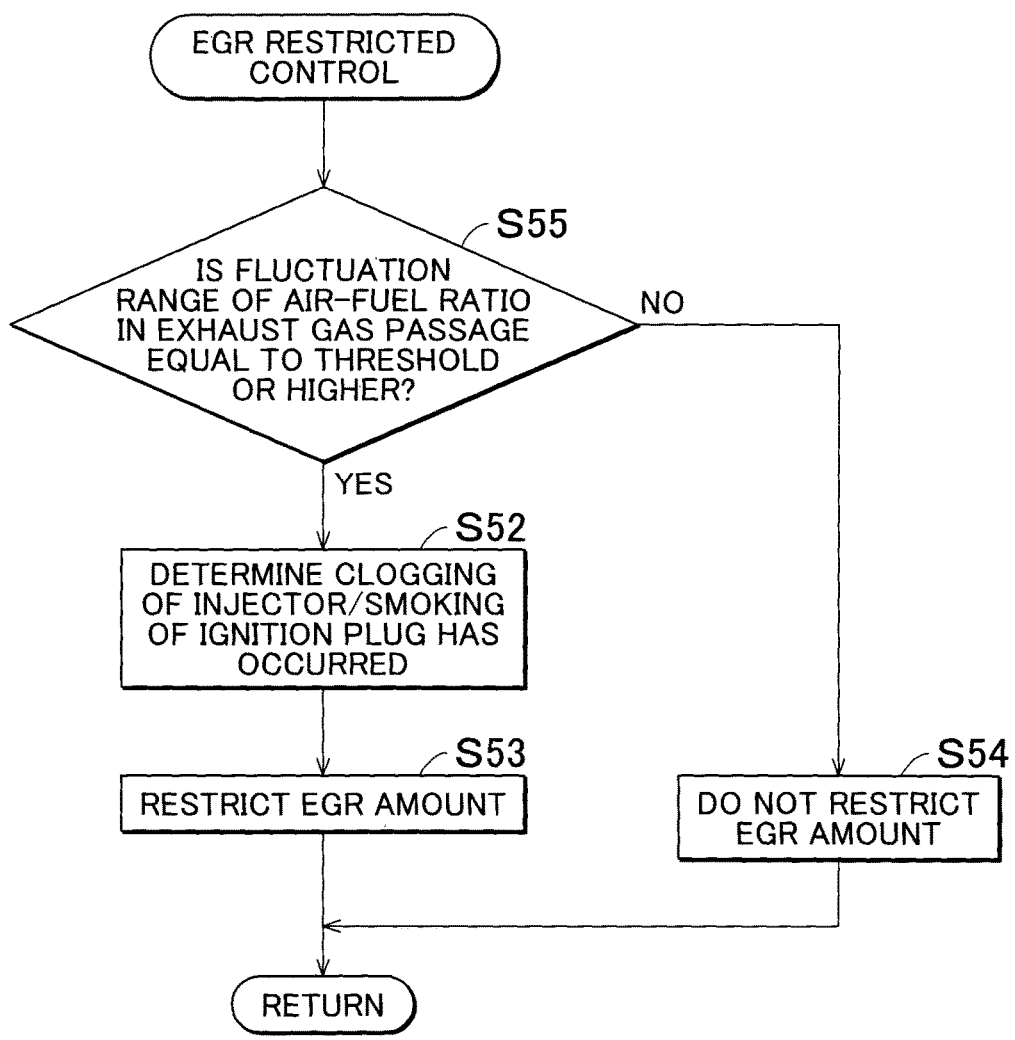
FIG. 9 is a flowchart for illustrating characteristics of the EGR restricted control in the outside electric power feed mode in the vehicle according to a modified example of the second embodiment of the present invention.

FIG. 9 is a flowchart for illustrating characteristics of the EGR restricted control in the outside electric power feed mode in the vehicle according to the modified example of the second embodiment of the present invention. In the EGR restricted control in the outside electric power feed mode according to a modified example of the second embodiment, step S50 (the EGR restricted control) in the flowchart of FIG. 4 is executed in accordance with the flowchart of FIG. 9.

Referring to FIG. 9, if the operation mode is the outside electric power feed mode, the EGR control section 208 determines whether the clogging of the injector 108 or the smoking of the ignition plug 110 has occurred. More specifically, the EGR control section 208 monitors the fluctuation of the air-fuel ratio A/F in the exhaust gas passage on the basis of the signal from the A/F sensor 304 (FIG. 2). The EGR control section 208 compares a fluctuation range of the air-fuel ratio A/F in the exhaust gas passage and a threshold thereof (step S55). Then, the EGR control section 208 executes the control of the EGR amount based on a comparison result in the same steps S52 to S54 as those in FIG. 7.

Figure 10:
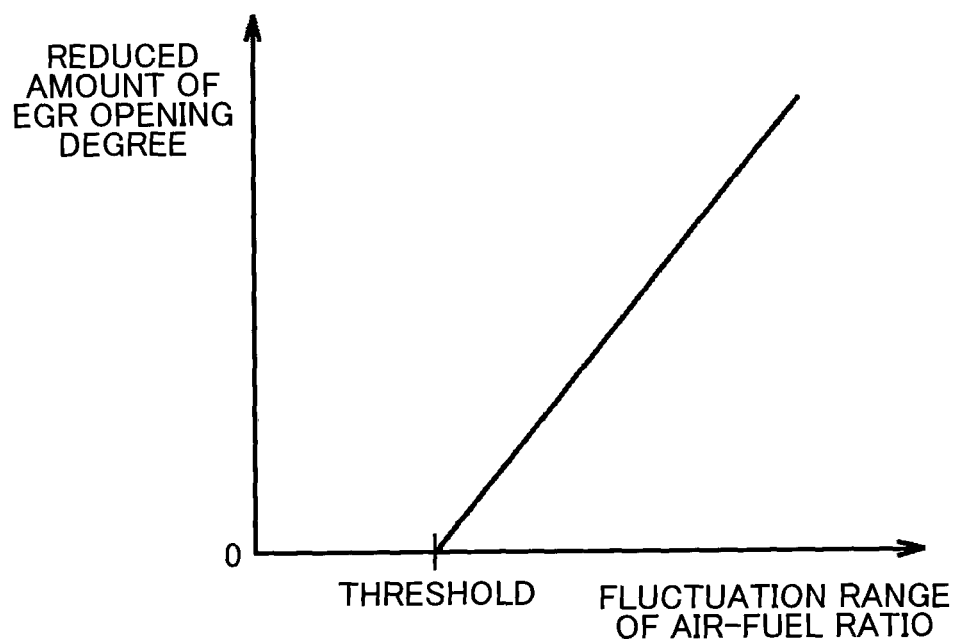
FIG. 10 is a schematic graph for illustrating a relationship between a fluctuation range of an air-fuel ratio in an exhaust gas passage and the reduced amount of the EGR opening degree.

Noted that, in the modified example of the second embodiment, it may be configured that the reduced amount of the EGR opening degree is changed in accordance with a magnitude of the fluctuation range of the air-fuel ratio A/F in the exhaust gas passage. FIG. 10 is a schematic graph for illustrating a relationship between the fluctuation range of the air-fuel ratio A/F in the exhaust gas passage and the reduced amount of the EGR opening degree. Referring to FIG. 10, the EGR control section 208 increases the reduced amount of the EGR opening degree as the fluctuation range of the air-fuel ratio A/F in the exhaust gas passage is increased. In other words, the EGR control section 208 determines that the degree of the clogging of the injector 108 or the degree of the smoking of the ignition plug 110 is high as the fluctuation range of the air-fuel ratio A/F in the exhaust gas passage is increased, and thus the restriction of the EGR amount is enhanced. Accordingly, the further progression of the clogging of the injector 108 or the smoking of the ignition plug 110 is suppressed. Therefore, it is possible to avoid the engine 100 from being brought into the state of misfire.

As it has been described so far, according to the vehicle in this second embodiment and the modified example, in the case where the clogging of the injector 108 or the smoking of the ignition plug 110 has not occurred, the EGR amount is not restricted, or the restriction of the EGR amount is alleviated even in the outside electric power feed mode. Thus, it is possible to benefit from the effect of the improved fuel economy by the EGR. As a result, the fuel economy can be improved while the engine 100 is avoided from being brought into the state of misfire.

Noted that, in the above-described first and second embodiments, the engine 100 corresponds to an example of the "internal combustion engine" in the present invention, and the voltage converter 30 and the outside electric power feed port 40 constitute an example of the "electric power output device" in the present invention. The EGR device corresponds to an example of the "recirculation device" in the present invention.

In addition, in the above-described first and second embodiments, the description has been made on the hybrid vehicle as a representative example of the vehicle capable of the outside electric power feed. However, the present invention can be applied to another type of vehicle as long as the electric power output device for supplying the electric power generated by using the engine to the outside of the vehicle is installed in the vehicle. In other words, for example, the present invention can be applied to an engine vehicle that only has the engine as a source of the drive force or to a hybrid vehicle having a different configuration from the configuration in FIG. 1. For example, the present invention can be applied to a so-called series type of hybrid vehicle that uses the engine 100 only for driving the motor generator MG1 and generates the drive force of the vehicle only by the motor generator MG2. In addition, the present invention can be applied to a hybrid vehicle in which only regenerative energy among motion energy that is generated by the engine 100 is recovered as electric energy or to a motor assisted type of hybrid vehicle in which the engine generates primary power and a motor assists the engine upon necessary. Furthermore, the present invention can be applied to a hybrid vehicle in which the motor is completely separated and the vehicle only travels by using the power of the engine.

It should be considered that the embodiments disclosed herein are illustrative in all aspects and not restrictive. The scope of the present invention is indicated not by the above description but by the claims, and intends to include all changes that fall within the equivalent meaning and scope to the claims.

The invention claimed is:
1. A vehicle comprising:
an internal combustion engine, the internal combustion engine including a recirculation device that recirculates exhaust gas of the internal combustion engine to an intake passage;
an electric power output device configured to output electric power generated by using the internal combustion engine to the outside of the vehicle; and
an electronic control unit configured to control a recirculation amount of the exhaust gas by the recirculation device in accordance with a load of the internal combustion engine such that, under the same load, the recirculation amount of the exhaust gas is restricted when the internal combustion engine is operated to generate electric power and the electric power output device outputs the electric power to the outside of the vehicle compared to when the internal combustion engine is operated to drive the vehicle.

2. The vehicle according to claim 1 wherein the electronic control unit is configured to restrict the recirculation amount of the exhaust gas under the same load when i) the electric power output device outputs the electric power to the outside of the vehicle and ii) a fluctuation range of a rotational speed of the internal combustion engine is equal to or higher than a threshold compared to when the electric power output device does not output the electric power to the outside of the vehicle.

3. The vehicle according to claim 1 wherein the electronic control unit is configured to restrict the recirculation amount of the exhaust gas under the same load when i) the electric power output device outputs the electric power to the outside of the vehicle and ii) a fluctuation range of an air-fuel ratio in an exhaust gas passage of the internal combustion engine is equal to or higher than a threshold compared to when the electric power output device does not output the electric power to the outside of the vehicle.

4. The vehicle according to claim 1 wherein the electronic control unit is configured to increase a reduced amount of the recirculation amount of the exhaust gas as elapsed time since the electric power output device starts outputting the electric power to the outside of the vehicle is extended.

5. The vehicle according to claim 1 wherein the electronic control unit is configured to reduce a reduced amount of the recirculation amount of the exhaust gas as the load of the internal combustion engine increases.

6. The vehicle according to claim 1 wherein the electronic control unit is configured to increase a reduced amount of the recirculation amount of the exhaust gas as a fluctuation range of a rotational speed of the internal combustion engine increases.

7. The vehicle according to claim 1 wherein the electronic control unit is configured to increase a reduced amount of the recirculation amount of the exhaust gas as a fluctuation range of an air-fuel ratio in an exhaust gas passage of the internal combustion engine increases.

8. The vehicle according to claim 1 wherein the electronic control unit is configured to stop actuation of the recirculation device when the electric power output device outputs the electric power to the outside of the vehicle.

9. The vehicle according to claim 1 wherein the electronic control unit is configured to stop actuation of the recirculation device when i) the electric power output device outputs the electric power to the outside of the vehicle and ii) a fluctuation range of a rotational speed of the internal combustion engine is equal to or higher than a threshold.

10. The vehicle according to claim 1 wherein the electronic control unit is configured to stop actuation of the recirculation device when i) the electric power output device outputs the electric power to the outside of the vehicle and ii) a fluctuation range of an air-fuel ratio in an exhaust gas passage of the internal combustion engine is equal to or higher than a threshold.

11. A control method for a vehicle, the vehicle including
an internal combustion engine, the internal combustion engine including a recirculation device that recirculates exhaust gas of the internal combustion engine to an intake passage, and
an electric power output device configured to output electric power generated by using the internal combustion engine to the outside of the vehicle,
the control method comprising:
determining whether or not a request for the electric power output device to output the electric power to the outside of the vehicle is made;
setting a recirculation amount of exhaust gas by the recirculation device in accordance with a load of the internal combustion engine; and
restricting, under the same load, the recirculation amount of the exhaust gas when the internal combustion engine is operated to generate electric power and the electric power output device outputs the electric power to the outside of the vehicle compared to when the internal combustion engine is operated to drive the vehicle.

* * * * *